US011345770B2

(12) United States Patent
Einsla et al.

(10) Patent No.: US 11,345,770 B2
(45) Date of Patent: May 31, 2022

(54) ACTIVATABLE ADHESIVE COMPOSITIONS AND LINERLESS LABELS AND TAPES COMPRISING SAME

(71) Applicant: Rohm and Haas Company, Collegeville, PA (US)

(72) Inventors: Melinda L. Einsla, Royersford, PA (US); Daniel W. Himmelberger, Green Lane, PA (US); William B. Griffith, Jr., North Wales, PA (US); Sarah Zolynski, Collegeville, PA (US)

(73) Assignee: Rohm and Haas Company, Midland, MI (US)

( * ) Notice: Subject to any disclaimer, the term of this patent is extended or adjusted under 35 U.S.C. 154(b) by 441 days.

(21) Appl. No.: 16/338,360

(22) PCT Filed: Jul. 25, 2017

(86) PCT No.: PCT/US2017/043591
§ 371 (c)(1),
(2) Date: Mar. 29, 2019

(87) PCT Pub. No.: WO2018/063477
PCT Pub. Date: Apr. 5, 2018

(65) Prior Publication Data
US 2019/0233689 A1 Aug. 1, 2019

Related U.S. Application Data

(60) Provisional application No. 62/402,416, filed on Sep. 30, 2016.

(51) Int. Cl.
| | |
|---|---|
| *C09J 133/14* | (2006.01) |
| *C08F 220/18* | (2006.01) |
| *C09J 7/35* | (2018.01) |
| *G09F 3/10* | (2006.01) |
| *C09J 7/10* | (2018.01) |
| *C09J 151/06* | (2006.01) |
| *C09J 133/08* | (2006.01) |
| *C08F 265/06* | (2006.01) |
| *C09J 7/38* | (2018.01) |
| *B32B 7/12* | (2006.01) |
| *B32B 37/12* | (2006.01) |
| *C08F 220/14* | (2006.01) |
| *C09J 5/06* | (2006.01) |
| *G09F 3/02* | (2006.01) |

(52) U.S. Cl.
CPC ......... *C08F 220/1804* (2020.02); *B32B 7/12* (2013.01); *B32B 37/1207* (2013.01); *C08F 220/14* (2013.01); *C08F 265/06* (2013.01); *C09J 5/06* (2013.01); *C09J 7/10* (2018.01); *C09J 7/35* (2018.01); *C09J 7/385* (2018.01); *C09J 133/08* (2013.01); *C09J 133/14* (2013.01); *C09J 151/06* (2013.01); *G09F 3/02* (2013.01); *G09F 3/10* (2013.01); *C08F 220/1808* (2020.02); *C09J 2301/304* (2020.08); *C09J 2301/414* (2020.08); *C09J 2301/416* (2020.08); *C09J 2433/00* (2013.01); *G09F 2003/025* (2013.01); *G09F 2003/0241* (2013.01)

(58) Field of Classification Search
CPC ...................................................... C09J 133/14
See application file for complete search history.

(56) References Cited

U.S. PATENT DOCUMENTS

| | | | |
|---|---|---|---|
| 4,091,162 | A | 5/1978 | Henderson et al. |
| 5,322,731 | A | 6/1994 | Callahan, Jr. et al. |
| 5,776,651 | A | 7/1998 | Lu et al. |
| 2007/0014985 | A1* | 1/2007 | Yuan-Huffman ......... C09J 9/00 428/355 R |
| 2013/0251944 | A1 | 9/2013 | Kian et al. |

FOREIGN PATENT DOCUMENTS

| | | |
|---|---|---|
| JP | 2003003147 | 1/2003 |
| WO | 2014093043 | 6/2014 |

OTHER PUBLICATIONS

PCT/US2017/043591, International Search Report and Written Opinion dated Sep. 11, 2017.
PCT/US2017/043591, International Preliminary Report on Patentability dated Apr. 2, 2019.

* cited by examiner

*Primary Examiner* — Daniel H Lee

(57) ABSTRACT

Activatable adhesive compositions are disclosed. The activatable adhesive compositions comprise a two-stage polymer particle, comprising a first stage comprising a hydrophilic acrylic polymer having an acid content of less than 200 mg KOH/g, a second stage polymerized within the first stage and comprising a hydrophobic acrylic polymer, and a tackifier soluble in the first stage and the second stage. Further, linerless labels and tapes comprising activatable adhesive compositions are disclosed. Still further, methods for adhering a first substrate to a second substrate using an activatable adhesive composition are also disclosed.

19 Claims, No Drawings

ACTIVATABLE ADHESIVE COMPOSITIONS AND LINERLESS LABELS AND TAPES COMPRISING SAME

REFERENCE TO RELATED APPLICATIONS

The present application claims the benefit of U.S. Provisional Application No. 62/402,416, filed on Sep. 30, 2016.

FIELD OF THE DISCLOSURE

The current disclosure relates to the field of adhesive labels and tapes as well as heat seal coatings. More particularly, the disclosure relates to linerless labels and tapes comprising heat-activatable pressure sensitive adhesives including two-stage acrylic polymer compositions. The disclosed heat-activatable pressure sensitive adhesives do not require a silicone topcoat or an adhesive that is tacky from the point of coating. Rather, the disclosed pressure sensitive adhesives have no initial tack but can be made tacky by application of an external stimulus, such as application of thermal energy, e.g., heat.

In some embodiments, activatable adhesive compositions for linerless tapes or labels and heat seal coatings are disclosed, the compositions, comprising a two-stage polymer particle and a tackifier soluble in the two-stage polymer particle. In some embodiments the two-stage polymer particle comprises a first stage comprising a hydrophilic acrylic polymer having an acid content of less than 200 mg KOH/g and a second stage polymerized within the first stage and comprising a hydrophobic acrylic polymer.

BACKGROUND AND SUMMARY OF THE DISCLOSURE

Many conventional adhesive products include release liners to prevent the adhesive product from prematurely adhering to a surface. Silicone release liners represent a significant amount of waste and cost in the label industry. Labels which do not require a release liner, or "linerless" labels, are gaining popularity in order to reduce waste and shipping costs. One approach for linerless labels is to top-coat the label surface with a silicone release coating. This eliminates the release liner stock but not the cost associated with the silicone itself. The top coating approach also does not address the problems associated with irreproducible cure of the silicone or the adverse impact on the appearance of a label which a top-coated silicone release layer creates. Alternative approaches use activatable adhesives which can be transformed from hard to tacky via an activation method, such as UV light or thermal activation.

Activatable adhesive compositions for use in linerless tapes and/or labels as well as heat seal coatings are desirable, particularly compositions providing for improved adhesion and blocking over existing approaches.

Activatable adhesive compositions are disclosed herein comprising a two-stage polymer particle. In some embodiments, the two-stage polymer particle comprises a first stage and a second stage polymerized within the first stage. In some embodiments, the first stage comprises a hydrophilic acrylic polymer having an acid content of less than 200 mg KOH/g. The second stage comprises a hydrophobic acrylic polymer. In some embodiments, the activatable adhesive compositions comprise a tackifier soluble in the first stage, the second stage, or both stages. In some embodiments, the tackifier is a hydrogenated rosin ester tackifier with a softening point between 90 and 110° C. In some embodiments, styrene is present in the first stage, the second stage, or both. In some embodiments, the first stage and second stage are immiscible.

In some embodiments, the first stage has a relatively higher glass transition temperature compared to that of the second stage. In some embodiments, the hydrophilic acrylic polymer has a relatively lower molecular weight compared to that of the hydrophobic acrylic polymer.

Pressure sensitive adhesives comprising the activatable adhesive compositions described herein are also disclosed. Linerless labels comprising the pressure sensitive adhesives described herein are also disclosed. Linerless tapes comprising the pressure sensitive adhesives described herein are also disclosed.

Methods for adhering a first substrate to a second substrate are disclosed, the methods comprising applying the activatable adhesive compositions disclosed herein to a surface of the first substrate, heating the activatable adhesive composition, and bringing the surface of the first substrate into contact with a surface of the second substrate.

DETAILED DESCRIPTION OF THE DISCLOSURE

Activatable adhesive compositions are disclosed comprising a two-stage polymer particle and a tackifier. In some embodiments, the two-stage polymer particle comprises a first stage and a second stage polymerized within the first stage.

First Stage

In some embodiments, the first stage comprises a hydrophilic acrylic polymer having an acid content of less than 200 mg KOH/g, or from 0 to 200 mg KOH/g, or from 10 to 150 mg KOH/g, or from 20 to 100 mg KOH/g. In some embodiments, the first stage has a glass transition temperature ("Tg") from 40 to 150° C., or from 50 to 100° C., or from 56 to 91° C. In some embodiments, the glass transition temperature of the first stage is relatively higher than the glass transition temperature of the second stage.

In some embodiments, the hydrophilic acrylic polymer of the first stage has a number-average molecular weight ("$M_n$") of from 2,000 to 100,000 g/mol, or from, or from 5,000 to 10,000 g/mol. In some embodiments, the molecular weight of the first stage is relatively lower than the molecular weight of the second stage.

The hydrophobicity of polymers in the first stage and second stage can be denoted using the Hansch hydrophobicity number. The Hansch hydrophobicity number is calculated as a weighted average of the substituent constants within a polymer composition. Substituent constants can be found as described in J. Am. Chem. Soc., 1964, 86 (23), pp. 5175-5180. A higher Hansch hydrophobicity number indicates a more hydrophobic polymer, while a lower number indicates a more hydrophilic polymer. More hydrophilic polymers (i.e., lower Hansch hydrophobicity numbers) tend to partition toward the outside of a particle. More hydrophobic polymers (i.e., higher Hansch hydrophobicity numbers) tend to partition toward the inside of a particle. In the disclosed embodiments, the Hansch hydrophobicity numbers of the first stage and second stage are different so that the stages remain mostly immiscible, with enough similarity to allow for interfacial stability. In addition, the more hydrophilic stage (i.e., lower Hansch hydrophobicity number) has a higher glass transition temperature than the other stage. In some embodiments, the hydrophilic acrylic polymer has a Hansch hydrophobicity number from 1.2 to 4.5, or from 1.5 to 3.5, or from 1.73 to 2.33.

In some embodiments, monomers suitable for production of the hydrophilic acrylic polymer include, but are not limited to, acrylic acid ("AA"), methacrylic acid ("MAA"), esters of AA and MAA, itaconic acid ("IA"), crotonic acid ("CA"), acrylamide ("AM"), methacrylamide ("MAM"), and derivatives of AM and MAM, e.g., alkyl (meth)acrylamides. Esters of AA and MAA include, but are not limited to, alkyl, hydroxyalkyl, phosphoalkyl and sulfoalkyl esters, e.g., methyl methacrylate ("MMA"), ethyl methacrylate ("EMA"), butyl methacrylate ("BMA"), hydroxyethyl methacrylate ("HEMA"), hydroxyethyl acrylate ("HEA"), hydroxypropyl methacrylate ("HPMA"), hydroxybutyl acrylate ("HBA"), methyl acrylate ("MA"), ethyl acrylate ("EA"), butyl acrylate ("BA"), 2-ethylhexyl acrylate ("EHA"), cyclohexyl methacrylate ("CHMA"), benzyl acrylate ("BzA"), isooctyl acrylate, lauryl acrylate, stearyl acrylate, and phosphoalkyl methacrylates (e.g., PEM), and mixtures of two or more thereof. Chain transfer agents can also be used which may include mercaptans, alcohols, or other suitable compounds. Examples of chain transfer agents may include, but are not limited to, methyl-3-mercaptopropionate, butyl-3-mercaptopropionate, dodecyl mercaptan, hexanethiol, isopropanol, and mixtures of two or more thereof.

In some embodiments, the hydrophilic acrylic polymer of the first stage comprises from 10 to 50 weight percent of the two-stage polymer particle.

Second Stage

The second stage comprises a hydrophobic acrylic polymer. In some embodiments, the second stage has a glass transition temperature from −80 to −30° C., or from −60 to −40° C., or from −55 to −45 C In some embodiments, the glass transition temperature of the second stage is relatively lower than the glass transition temperature of the first stage.

In some embodiments, the hydrophobic acrylic polymer of the second stage has a number-average molecular weight ("$M_n$") of from 10,000 to 1,000,000 g/mol, or from 20,000 to 500,000 g/mol, or from 30,000 to 100,000 g/mol. In some embodiments, the molecular weight of the second stage is relatively higher than the molecular weight of the first stage.

In some embodiments, the hydrophobic acrylic polymer has a Hansch hydrophobicity number from 2.0 to 11.0, or from 2.5 to 6.0, or from 3.23 to 3.34.

In some embodiments, monomers suitable for production of the hydrophobic acrylic polymer include, but are not limited to, acrylic acid ("AA"), methacrylic acid ("MAA"), esters of AA and MAA, itaconic acid ("IA"), crotonic acid ("CA"), acrylamide ("AM"), methacrylamide ("MAM"), and derivatives of AM and MAM, e.g., alkyl (meth)acrylamides. Esters of AA and MAA include, but are not limited to, alkyl, hydroxyalkyl, phosphoalkyl and sulfoalkyl esters, e.g., methyl methacrylate ("MMA"), ethyl methacrylate ("EMA"), butyl methacrylate ("BMA"), hydroxyethyl methacrylate ("HEMA"), hydroxyethyl acrylate ("HEA"), hydroxypropyl methacrylate ("HPMA"), hydroxybutyl acrylate ("HBA"), methyl acrylate ("MA"), ethyl acrylate ("EA"), butyl acrylate ("BA"), 2-ethylhexyl acrylate ("EHA"), cyclohexyl methacrylate ("CHMA"), benzyl acrylate ("BzA"), isooctyl acrylate, lauryl acrylate, stearyl acrylate, and phosphoalkyl methacrylates (e.g., PEM), stearyl methacrylate ("SMA"), and mixtures of two or more thereof.

In some embodiments, the second stage contains at least 80 weight percent butyl acrylate, based upon the weight of the second stage.

Two-Stage Polymer Particle Synthesis

In some embodiments, the first stage—the harder, more hydrophilic stage—is polymerized before the second stage, i.e., the first stage is the "first stage" or "Stage 1." The second stage—the softer, more hydrophobic stage—is polymerized within the first stage, i.e., the second stage is the "second stage" or "Stage 2." The hard hydrophilic stage can be synthesized in-situ or one may use an existing alkali-soluble polymer.

In some embodiments, the first stage comprises from 10 to 50, or from 10 to 30, or from 15 to 25 weight percent of the two-stage polymer particle. In some embodiments, the second stage comprises from 50 to 90, or from 70 to 90, or from 75 to 85 weight percent of the two-stage polymer particle.

Tackifier

The disclosed activatable adhesive compositions further comprise a tackifier. In some embodiments, the tackifier is blended together with the two-stage polymer. In some embodiments, the tackifier is soluble in the first stage, the second stage, or both stages. That is, the tackifier is compatible with both the first stage and the second stage of the two-stage polymer particle. In some embodiments, the tackifier is a hydrogenated rosin ester tackifier. In some embodiments, the tackifier has a softening point from 85 to 130° C., or from 90 to 120° C., or from 90 to 110° C. In some embodiments, the tackifier is a hydrogenated rosin ester tackifier with a softening point from 90 to 110° C.

In some embodiments, the tackifier accounts for 5 to 50 weight percent of the total weight of the two-stage polymer particle and tackifier blend, based upon the dry weight of the blend.

In some embodiments, styrene is present in the first stage, the second stage, or both stages.

The disclosed activatable adhesive composition can be incorporated into various applications, including, for instance, pressure sensitive adhesives for linerless labels and tapes as well as heat seal coatings.

Methods for adhering a first substrate to a second substrate are also disclosed herein. In some embodiments, the method includes applying an activatable adhesive composition, such as those discussed herein, to a surface of the first substrate, applying thermal energy, such as heat, to the activatable adhesive composition, and bringing the surface of the first substrate into contact with a surface of the second substrate. The disclosed activatable adhesive compositions are initially hard and are transformed to tacky upon application of thermal energy. In this way, a linerless label or tape including the disclosed activatable adhesives can be wound without any adhesion or blocking issues and, when the label or tape is ready to be adhered to a surface, the adhesive can be thermally activated.

EXAMPLES OF THE DISCLOSURE

The present disclosure will now be explained in further detail by showing Illustrative Examples and Comparative Examples (collectively, "the Examples"). However, the scope of the present disclosure is not, of course, limited to the Examples.

Examples Preparation: Synthesis

The Examples are prepared by a two-stage gradual addition acrylic polymerization processes. The processes described herein are made by two different methods determined by the choice of initial preform seed used to establish the final particle size of the emulsion. A preform seed is a small particle with relatively uniform particle size which can be used to "seed" the particles formed during the emulsion polymerization process. The two preform seeds used are of varying particle sizes and therefore require different levels or ratios to the total monomer content in order to achieve a final particle size of 200 nm. The processes are summarized in Table 1 below.

TABLE 1

Process Summaries

| Process | Preform | Average Preform Particle Size (nm) | Seed Percent | Final particle size (nm), theoretical |
|---|---|---|---|---|
| A | 1 | 100 | 12.5% | 200 |
| B | 2 | 60 | 2.7% | 200 |

Illustrative Example 1 ("IE1") ~45% Solids

Into a four neck 5 L round bottom flask fitted with an overhead stirrer, nitrogen sweep, and thermocouple, an initial charge of deionized water and 12.5 wt % (based on total monomer ("BOTM")) polymer Preform 1 is heated to 90° C. with a nitrogen sweep. At 90° C., the nitrogen is turned off and the heat source is decreased in order to keep the kettle warm. 0.15 wt % (based on total monomer) ammonium carbonate, used as buffer, and 0.3 wt % (based on total monomer) ammonium persulfate ("APS") are added to the flask. With a starting temperature of 82 to 84° C., the Stage 1 monomer emulsion ("ME") comprising 10 wt % of the total monomers in the two stage process, surfactant, and water are fed over 25 minutes and 0.8 wt % (based on stage monomer) APS was fed over 35 minutes at a reaction temperature of 85° C. The relevant components of the various Stage 1 and Stage 2 monomer emulsions of the Examples are detailed in Table 2. After the APS feed finishes, the batch is held at 85° C. for 20 minutes. After the 20 minute hold, the Stage 2 ME comprising 90% of the total monomers in the two stage process, surfactant, and water are then fed into the reactor over 90 minutes while an initiator charge of 0.12 wt % (based on total monomer) APS with the addition of 0.2 grams of ~29% ammonia is fed to the kettle over 110 minutes. The batch is then held at 85° C. for 20 minutes and cooled to 60° C. At 60° C., a shot of 0.009% FeSO$_4$ 7H$_2$O is added followed by 0.1 wt % (based on total monomer) tert-butylhydroperoxide (t-BHP) and 0.06 wt % (BOTM) sodium sulfoxylate formaldehyde ("SSF"). The batch is then held for 20 minutes at 60° C. At the end of the hold, 0.06 wt % (based on total monomer) hydrogen peroxide is added. The batch is then cooled to 45° C. and neutralized to pH 8.5 by the addition of ~14% aqueous ammonium hydroxide. The batch is then cooled to 35° C. and filtered through a 100 mesh screen.

Illustrative Example 2 ("IE2") and Comparative Example 3 ("CE3") ~45% Solids

Illustrative Example 2 and Comparative Example 3 are made in the same fashion as Illustrative Example 1, with different Stage 1 and Stage 2 compositions, which are detailed in Table 2.

Illustrative Example 3 ("IE3") ~45% Solids

Into a four neck 5 L round bottom flask fitted with an overhead stirrer, nitrogen sweep, and thermocouple, an initial charge of deionized water is heated to 90° C. with a nitrogen sweep. At 90° C., the nitrogen was turned off and the heat source is decreased in order to keep the kettle warm. To the kettle is added 0.3 wt % (based on total monomer) APS and a polymer Preform 2 charge of 2.7 wt % (based on total monomer). With a starting temperature of 82 to 84° C., the Stage 1 ME comprising 15 wt % of the total monomers in the two stage process, surfactant, and water are fed over 35 minutes and 0.8 wt % (based on stage monomer) APS is fed over 45 minutes at a reaction temperature of 85° C. After the APS feed finishes, the batch is held at 85° C. for 20 minutes. After this 20 minute hold, the Stage 2 ME comprising 85% of the total monomers in the two stage process, surfactant, and water are then fed into the reactor over 90 minutes while 0.12 wt % (based on total monomer) APS is fed to the kettle over 110 minutes. The feeds are started at half of the final feed rate for the first 10 minutes and then the remainder of monomer emulsion is fed over the remaining 80 and 100 minutes, respectively. The batch is then held at 85° C. for 20 minutes and cooled to 60° C. At 60° C., a shot of 0.009% FeSO$_4$ 7H$_2$O is added followed by 0.1 wt % (based on total monomer) tert-butylhydroperoxide (t-BHP) and 0.06 wt % (based on total monomer) SSF. The batch is then held for 20 minutes at 60° C. At the end of the hold, a second chase of 0.06 wt % (based on total monomer) hydrogen peroxide is added. The batch is then cooled to 45° C. and neutralized to pH 8.5 by the addition of ~14% aqueous ammonium hydroxide. The batch is then cooled to 35° C. and filtered through a 100 mesh screen.

Illustrative Example 4 ("IE4") ~45% Solids

Illustrative Example 4 is made in the same fashion as Illustrative Example 3 with the exception of the monomer emulsion stage ratios. The changes in the monomer emulsion stage ratio results in changes in the subsequent monomer emulsion feeding schedules. In the case of Illustrative Example 4, the Stage 1 ME comprising 20 wt % of the total monomers in the two stage process, surfactant, and water fed over 40 minutes and 0.8 wt % (based on stage monomer) APS is fed over 50 minutes at a reaction temperature of 85° C. while the Stage 2 ME comprising 80% of the total monomers in the two stage process, surfactant, and water was then fed into the reactor over 85 minutes while 0.12 wt % (based on total monomer) APS is fed to the kettle over 105 minutes. The feeds are started at half rates for the first 10 minutes and then ramped to the full rate for the remaining 75 and 95 minutes, respectively. All other aspects of Illustrative Example 4 are identical to Illustrative Example 3.

Illustrative Example 5 ("IE5") ~45% Solids

Illustrative Example 5 is made in the same fashion as Illustrative Example 3 with the exception of the monomer emulsion stage ratios. The changes in the stage ratio resulted in changes in their subsequent ME feeding schedules. In the case of Illustrative Example 5, the Stage 1 ME comprising 25 wt % of the total monomers in the two stage process, surfactant, and water fed over 45 minutes and 0.8 wt % (based on stage monomer) APS is fed over 55 minutes at a reaction temperature of 85° C. while the Stage 2 ME comprising 75 wt % of the total monomers in the two stage process, surfactant, and water are then fed into the reactor over 80 minutes while 0.12 wt % (based on total monomer) APS is fed to the kettle over 100 minutes. The feeds are started at half rates for the first 10 minutes and then ramped to the full rate for the remaining 70 and 90 minutes, respectively. All other aspects of Illustrative Example 5 are identical to Illustrative Example 3.

Illustrative Examples 6 ("IE6") Through 12 ("IE12") ~45% Solids

Illustrative Examples 6 through 12 are made in the same fashion as Illustrative Example 3, with the changes noted in Table 2.

Illustrative Example 13 ("IE13") and Comparative Example 2 ("CE2") ~45% Solids

Illustrative Example 13 and Comparative Example 2 are made in the same fashion as Illustrative Example 1, with the changes noted in Table 2.

Comparative Example 1 ("CE1") ~50% Solids

Into a four neck 5 L round bottom flask fitted with an overhead stirrer, nitrogen sweep, and thermocouple, an initial charge of deionized water is heated to 90° C. with a nitrogen sweep. At 90° C., the nitrogen is turned off and the heat source was decreased in order to keep the kettle warm. To the kettle is added 0.3 wt % (based on total monomer) APS and a polymer Preform 2 charge of 2.7 wt % (based on total monomer). With a starting temperature of 82 to 84° C., the Stage 1 ME comprising of 85% of the total monomers in the two stage process, surfactant, and water is fed over 90 minutes and 0.14 wt % (based on stage monomer) APS is fed over 110 minutes at a reaction temperature of 85° C. The feeds are started at half rates for the first 10 minutes and then ramped to the full rate for the remaining 80 and 100 minutes, respectively. After the APS feed finishes, the batch is held at 85° C. for 20 minutes. After this 20 minute hold, the Stage 2 ME comprising 15% of the total monomers in the two stage process, surfactant and water is fed into the reactor over 35 minutes while 0.12 wt % (based on total monomer) APS is fed to the flask over 45 minutes. The batch is aborted 7 minutes into the Stage 2 feeds due to the formation of gel. The contents of the flask are chased with redox reagents and the batch is discarded.

Comparative Example 4 ("CE4") ~45% Solids

Comparative Example 4 is prepared using a single stage monomer emulsion with an overall composition matching that of Illustrative Example 1. Into a four neck 5 L round bottom flask fitted with an overhead stirrer, nitrogen sweep, and thermocouple, an initial charge of deionized water and 12.5 wt % (based on total monomer) polymer Preform 1 is heated to 91° C. with a nitrogen sweep. At 91° C., the nitrogen is turned off and the heat source is decreased in order to keep the kettle warm. To the kettle are added 0.15 wt % (based on total monomer) ammonium carbonate, used as buffer, and 0.3 wt % (based on total monomer) APS. With a starting temperature of 82 to 84° C., the ME comprising 100% of the total monomers in a single stage process, surfactant, and water are fed over 120 minutes and 0.2 wt % (based on total monomer) APS is fed over 140 minutes at a reaction temperature of 85° C. After the APS feed finished, the batch is held at 85° C. for 20 minutes. After this 20 minute hold, the batch is cooled to 60° C. At 60° C., a shot of 0.009% $FeSO_4 \cdot 7H_2O$ is added followed by 0.1 wt % (based on total monomer) t-BHP and 0.05 wt % (based on total monomer) SSF. The batch is then held for 20 minutes at 60° C. At the end of the hold, 0.06 wt % (based on total monomer) hydrogen peroxide is added. The batch is then cooled to 45° C. and neutralized to pH 8.5 by the addition of ~14% aqueous ammonium hydroxide. The batch is then cooled to 35° C. and filtered through a 100 mesh screen.

TABLE 2

Example Compositions

| Example | Composition | Preform |
|---|---|---|
| IE1 | 10% Stage I (50 methyl methacrylate ("MMA")/25 2-hydroxyethyl methacrylate ("HEMA")/15 butyl acrylate ("BA")/10 styrene ("STY")/5 methyl-3-mercaptopropionate ("MMP")) 90% Stage II (96 BA/4 STY/0.01 MMP) | Preform 1 |
| IE2 | 15% Stage I (50 MMA/25 HEMA/15 BA/10 STY/5 MMP) 85% Stage II (96 BA/4 STY/0.01 MMP) | Preform 1 |
| IE3 | 15% Stage I (50 MMA/25 HEMA/15 BA/10 STY/5 MMP) 85% Stage II (96 BA/4 STY/0.01 MMP) | Preform 2 |
| IE4 | 20% Stage I (50 MMA/25 HEMA/15 BA/10 STY/5 MMP) 80% Stage II (96 BA/4 STY/0.01 MMP) | Preform 2 |
| IE5 | 25% Stage I (50 MMA/25 HEMA/15 BA/10 STY/5 MMP) 75% Stage II (96 BA/4 STY/0.01 MMP) | Preform 2 |
| IE6 | 15% Stage I (75 MMA/25 HEMA/5 MMP) 85% Stage II (96 BA/4 STY/0.01 MMP) | Preform 2 |
| IE7 | 15% Stage I (62.5 MMA/25 HEMA/7.5 BA/5 STY/5 MMP) 85% Stage II (96 BA/4 STY/0.01 MMP) | Preform 2 |
| IE8 | 15% Stage I (65 MMA/25 HEMA/10 STY/5 MMP) 85% Stage II (96 BA/4 STY/0.01 MMP) | Preform 2 |
| IE9 | 15% Stage I (60 MMA/25 HEMA/15 BA/5 MMP) 85% Stage II (96 BA/4 STY/0.01 MMP) | Preform 2 |
| IE10 | 15% Stage I (75 MMA/15 BA/10 STY/5 MMP) 85% Stage II (96 BA/4 STY/0.01 MMP) | Preform 2 |
| IE11 | 15% Stage I (70 MMA/5 HEMA/15 BA/10 STY/5 MMP) 85% Stage II (96 BA/4 STY/0.01 MMP) | Preform 2 |
| IE12 | 15% Stage I (65 MMA/10 HEMA/15 BA/10 STY/5 MMP) 85% Stage II (96 BA/4 STY/0.01 MMP) | Preform 2 |
| IE13 | 10% Stage I (50 MMA/25 HEMA/15 BA/10 STY/5 MMP) 90% Stage II (91 BA/5 2-ethylhexyl acrylate ("EHA")/4 STY/0.01 MMP) | Preform 1 |

TABLE 2-continued

Example Compositions

| Example | Composition | Preform |
|---|---|---|
| CE1 | 15% Stage II (50 MMA/25 HEMA/15 BA/10 STY) 85% Stage I (96 BA/4 STY/0.01 MMP) Reaction failed | Preform 2 |
| CE2 | 10% Stage I (50 MMA/25 HEMA/15 BA/10 STY/5 MMP) 90% Stage II (76 BA/20 EHA/4 STY/0.01 MMP) | Preform 1 |
| CE3 | (Example #2) composition with different tackifier | Preform 1 |
| CE4 | (87.9 BA/5 MMA/4.6 STY/2.5 HEMA + 0.51% MMP) One Stage | Preform 1 |

Acceptable glass transition temperatures range for the first stage (i.e., Stage 1, the hydrophilic stage) range from 40 to 150° C. This range of glass transition temperatures ensures a solid shell at room temperature up to common blocking temperatures (approximately 40° C.) to keep the soft, sticky core contained. The glass transition temperatures of the Illustrative Examples range from 56 to 91° C. for the first stage. The glass transition temperatures of the Examples is determined according to the Fox-Flory Equation Acceptable glass transition temperatures for the second stage (i.e., Stage 2, the hydrophobic stage) range from −65 to −25° C. This range of glass transition temperatures ensures that the core has adhesive properties. The glass transition temperatures of the Illustrative Examples range from −58 to −50° C. in second stage. As discussed above, hydrophobicity can be indicated using Hansch hydrophobicity numbers. Table 3 details Hansch hydrophobicity numbers for the first and second stages of Illustrative Examples 1 to 3 and Comparative Examples 1 to 4. The numbers shown are calculated in the state that exists at the pH during the polymerization reaction. As discussed above, it is desirable for the purposes of this disclosure that the Hansch hydrophobicity numbers for the two stages are different so that they remain immiscible, and that the more hydrophilic stage is also the higher glass transition temperature stage.

TABLE 3

Tg and Hansch Values

| Example | First Stage Tg (° C.) | Second Stage Tg (° C.) | First Stage Hansch Hydrophobicity | Second Stage Hansch Hydrophobicity |
|---|---|---|---|---|
| IE1 | 56.2 | −50.3 | 2.17 | 3.23 |
| IE2 | 56.2 | −50.3 | 2.17 | 3.23 |
| IE3 | 56.2 | −50.3 | 2.17 | 3.23 |
| IE4 | 56.2 | −50.3 | 2.17 | 3.23 |
| IE5 | 56.2 | −50.3 | 2.17 | 3.23 |
| IE6 | 91.1 | −50.3 | 1.73 | 3.23 |
| IE7 | 72.8 | −50.3 | 1.95 | 3.23 |
| IE8 | 90.7 | −50.3 | 1.97 | 3.23 |
| IE9 | 56.6 | −50.3 | 1.93 | 3.23 |
| IE10 | 67.5 | −50.3 | 2.33 | 3.23 |
| IE11 | 65.1 | −50.3 | 2.29 | 3.23 |
| IE12 | 62.9 | −50.3 | 2.26 | 3.23 |
| IE13 | 56.2 | −52.2 | 2.17 | 3.34 |
| CE1 | −50.3 | 56.2 | 3.23 | 2.17 |
| CE2 | 56.2 | −57.5 | 2.17 | 3.64 |
| CE3 | 56.2 | −50.3 | 2.17 | 3.23 |
| CE4 (single stage) | −42.9 | | 3.13 | |

Formulation of Adhesive Compositions

In the Examples, the two component formulations are weighed into 6 dram vials in the desired ratio with a total wet-weight of 20 grams. Ratios given in the tables disclosed herein are in wet-weight percent. The vials are capped and shaken by hand for 30 seconds to ensure the samples are well mixed. The samples are then allowed to rest for 2 hours before being applied to a substrate (2 mil polyethylene terephthalate, obtained from Chemsultants). A 1.6 mil wet coating of the sample mixture is applied to the substrate with a BYK applicator bar. The coated samples are then dried in a convection oven at 40° C. for 10 minutes, leaving a 0.5 to 0.9 mil dry film. The tackifier ladder Examples are described as variants and labeled as such: 10 wet weight percent tackifier in polymer emulsion labeled as "A", 20 wet weight percent tackifier in polymer emulsion labeled as "B", 30 wet weight percent tackifier in polymer emulsion labeled as "C", and 40 wet weight percent tackifier in polymer emulsion labeled as "D" regardless of tackifier or emulsion solids. The variants described as "Alone" are pure polymer emulsion.

All formulations in the Examples give wet weight fractions. Dry film solids can be calculated based on the given solids of each component in the formulation.

Raw Materials Formulation

Snowtack FH95G—hydrogenated rosin ester dispersion by Lawter, ~57% solids.

Dermulsene DP 0708—stabilized rosin ester dispersion by MWV Specialty Chemicals, 53% solids.

Adhesion Test Method

The dry films are placed against silicone release paper for protection and left in a controlled temperature (72° F.) and humidity (50% RH) room overnight to equilibrate. The films are then cut into 1 inch by 6 inch strips for adhesive (i.e., peel) and blocking tests. Two sets of strips are prepared with one set being applied to the test substrates without activation and the other being heat activated. The activated test strips are activated by heat using a Werner Mathis AG oven set at 110° C. and 15 seconds with the strips adhesive side up resting on a mesh shelf where the square mesh is 0.5 cm. The strips are then immediately laminated to test substrates described below with a 2 kg hand roller. The unactivated test strips are applied to the test substrates with the same 2 kg hand roller. Peel force is a measure of the force required to remove a film coated with an adhesive from a substrate. Peel force is measured after a 60 minute dwell time and 24 hour dwell time after the lamination step. Specifically 180° peel force is measured using test method PSTC 101 Test Method A from stainless steel ("SS") panels and high density polyethylene ("HDPE") panels once for each dwell time. A peel rate of 12 inches per minute was used for all tests rather than the 5 mm/second prescribed in the test method.

TABLE 4

Adhesion Test Results

| | | 180° Peel to SS ||||||||
| | | Unactivated |||| Activated ||||
| Tackifier ladder with Snowtack FH95G | Variant | 1 hr dwell | FM (A = adhesion; C = cohesion) | 24 hr dwell | FM (A = adhesion; C = cohesion) | 1 hr dwell | FM | 24 hr dwell | FM (A = adhesion; C = cohesion) |
|---|---|---|---|---|---|---|---|---|---|
| IE 1 | Alone | 5.1 | A | 6.1 | A | 9 | A | 8.8 | A |
| IE 1A | 10% FH 95G | 5.7 | A | 5 | A | 8.2 | A | 10.4 | A |
| IE 1B | 20% FH 95 G | 5.7 | A | 4.4 | A | 24.6 | A | 15.3 | A |
| IE 1C | 30% FH 95 G | 0.7 | A | 1 | A | 15.3 | A | 4.7 | A |
| IE 1D | 40% FH 95 G | 1.1 | A | 0.4 | A | 11.6 | A | 4.5 | A |
| IE 2 | Alone | 4.4 | A | 4.4 | A | 5.2 | A | 8.7 | A |
| IE 2A | 10% FH 95G | 4.1 | A | 2.8 | A | 5.3 | A | 7.9 | A |
| IE 2B | 20% FH 95 G | 1.4 | A | 1.1 | A | 21.2 | A | 16.3 | A |
| IE 2C | 30% FH 95 G | 0.8 | A | 0.9 | A | 15.3 | A | 6.8 | A |
| IE 2D | 40% FH 95 G | 0.3 | A | 0.6 | C | 7.1 | A | 4.8 | A |
| IE 3 | Alone | 4.4 | A | 5.2 | A | 4.3 | A | 4.6 | A |
| IE 3A | 10% FH 95G | 7.7 | A | 6.1 | A | 9.8 | A | 10.6 | A |
| IE 3B | 20% FH 95 G | 1.9 | A | 1.7 | A | 13.9 | A | 12.8 | A |
| IE 3C | 30% FH 95 G | 0.5 | A | 0.4 | A | 14 | A | 6.7 | A |
| IE 3D | 40% FH 95 G | 0.5 | A | 0.4 | A | 9.6 | A | 4.8 | A |
| IE 4 | Alone | 13.4 | A | 5.8 | A | 7.8 | A | 7.9 | A |
| IE 4A | 10% FH 95G | 5.5 | A | 1.6 | A | 7.4 | A | 7.7 | A |
| IE 4B | 20% FH 95 G | 2.4 | A | 0.8 | C | 11.6 | A | 6 | A |
| IE 4C | 30% FH 95 G | 1.1 | A | 0.4 | C | 12.1 | A | 4.9 | C |
| IE 4D | 40% FH 95 G | 0.6 | A | 0.4 | C | 1.3 | A | 3.4 | A |
| IE 5 | Alone | 10.5 | C | 1.3 | A | 1.8 | C | 5.4 | A |
| IE 5A | 10% FH 95G | 2.3 | A | 1.5 | A | 8.3 | A | 7.9 | A |
| IE 5B | 20% FH 95 G | 1.8 | C | 1 | C | 11.2 | A | 6.1 | A |
| IE 5C | 30% FH 95 G | 0.7 | A | 0.5 | C | 12.2 | A | 2.6 | A |
| IE 5D | 40% FH 95 G | 0.3 | A | 0.6 | C | 10.7 | A | 3.3 | A |
| IE 6 | Alone | 1 | A | 1.4 | A | 0.4 | A | 0.4 | A |
| IE 6A | 10% FH 95G | 6.1 | A | 4.6 | A | 5.2 | A | 2.1 | A |
| IE 6B | 20% FH 95 G | 0.4 | A | 1 | A | 7.7 | A | 7.5 | A |
| IE 6C | 30% FH 95 G | 0.2 | A | 0.4 | A | 13.1 | A | 5.3 | A |
| IE 6D | 40% FH 95 G | 0.2 | A | 0.5 | A | 7.4 | A | 4.6 | A |
| IE 7 | Alone | 2.3 | A | 3.1 | A | 2.4 | A | 2 | A |
| IE 7A | 10% FH 95G | 7.8 | A | 6.1 | A | 8.2 | A | 8 | A |
| IE 7B | 20% FH 95 G | 1.1 | A | 1.3 | A | 14.1 | A | 13.1 | A |
| IE 7C | 30% FH 95 G | 0.3 | A | 0.4 | A | 13.3 | A | 6.9 | A |
| IE 7D | 40% FH 95 G | 0.3 | A | 0.4 | A | 9.3 | A | 3.7 | A |
| IE 8 | Alone | 2.6 | A | 1.6 | A | 0.7 | A | 0.7 | A |
| IE 8A | 10% FH 95G | 6.6 | A | 6.2 | A | 4.5 | A | 3.9 | A |
| IE 8B | 20% FH 95 G | 0.9 | A | 0.9 | A | 9.4 | A | 9.6 | A |
| IE 8C | 30% FH 95 G | 0.4 | A | 0.4 | A | 11.4 | A | 6 | A |
| IE 8D | 40% FH 95 G | 0.3 | A | 0.2 | A | 5.3 | C | 4.1 | A |
| IE 9 | Alone | 3.3 | A | 2.1 | A | 2 | A | 3.2 | A |
| IE 9A | 10% FH 95G | 7.9 | A | 6.4 | A | 7.5 | A | 10.4 | A |
| IE 9B | 20% FH 95 G | 1.6 | A | 1.5 | A | 12.6 | A | 11.5 | A |
| IE 9C | 30% FH 95 G | 0.5 | A | 0.4 | A | 13.2 | A | 6.9 | A |
| IE 9D | 40% FH 95 G | 0.5 | A | 0.4 | A | 7.7 | A | 3.9 | A |
| IE 10 | Alone | 6.2 | A | 6 | A | 7.4 | A | 6.9 | A |
| IE 10A | 10% FH 95G | 10 | A | 7.7 | A | 11.2 | A | 8.7 | A |
| IE 10B | 20% FH 95 G | 2.9 | A | 0.5 | A | 22.3 | A | 15.2 | A |
| IE 10C | 30% FH 95 G | 1 | A | 0.3 | A | 20.5 | A | 9.5 | A |
| IE 10D | 40% FH 95 G | 0.3 | A | 0.2 | A | 15.2 | A | 5.3 | A |
| IE 11 | Alone | 10.9 | A | 8.3 | A | 7.7 | A | 5 | A |
| IE 11A | 10% FH 95G | 9.4 | A | 8.4 | A | 11.4 | A | 10.2 | A |
| IE 11B | 20% FH 95 G | 2.4 | A | 0.5 | A | 32.4 | C | 14.4 | A |
| IE 11C | 30% FH 95 G | 0.6 | A | 0.3 | A | 26.3 | A | 8.7 | A |
| IE 11D | 40% FH 95 G | 0.5 | A | 0.2 | A | 14.4 | A | 4.8 | A |
| IE 12 | Alone | 9.3 | A | 7.9 | A | 5.2 | A | 5.2 | A |
| IE 12A | 10% FH 95G | 7.8 | A | 6.7 | A | 10.7 | A | 9.1 | A |
| IE 12 B | 20% FH 95 G | 3.4 | A | 1 | A | 22.8 | A | 13.9 | A |
| IE 12C | 30% FH 95 G | 0.9 | A | 0.3 | A | 18.5 | A | 8.2 | A |
| IE 12D | 40% FH 95 G | 0.4 | A | 0.2 | A | 14.4 | A | 5.8 | A |
| IE 13 | Alone | 3.3 | A | 4.6 | A | 9.4 | A | 11 | A |
| IE 13A | 10% FH 95G | 10.4 | A | 10.8 | A | 7.8 | A | 10.9 | A |
| IE 13B | 20% FH 95 G | 7 | A | 7.2 | A | 25.9 | A | 17.1 | A |
| IE 13C | 30% FH 95 G | 2.3 | A | 5.5 | A | 22.8 | A | 7.3 | A |
| IE 13D | 40% FH 95 G | 2 | A | 1.2 | A | 20.2 | A | 5.3 | A |
| CE 2 | Alone | 5 | A | 7.8 | A | 6 | A | 5.9 | A |
| CE 2A | 10% FH 95G | 10 | A | 10.2 | A | 9.4 | A | 13.3 | A |
| CE 2B | 20% FH 95 G | 18.5 | A | 18.2 | A | 16.4 | A | 15.1 | A |
| CE 2C | 30% FH 95 G | 18.2 | A | 16.4 | A | 21 | A | 18.9 | A |
| CE 2D | 40% FH 95 G | 14.7 | A | 12.5 | A | 33.3 | C | 24.9 | A |

TABLE 4-continued

Adhesion Test Results

| | | | | | | | | |
|---|---|---|---|---|---|---|---|---|
| CE 3A | 10% DR-0708 | 9.3 | A | 8.1 | A | 6.6 | A | 10 | A |
| CE 3B | 20% DR-0708 | 6.1 | A | 2.1 | A | 15 | A | 7.8 | A |
| CE 3C | 30% DR-0708 | 9.6 | A | 6.3 | A | 20.5 | A | 17.6 | A |
| CE 3D | 40% DR-0708 | 12.3 | A | 1.7 | C | 22.8 | A | 1.9 | C |
| CE 4 | Alone | 4.6 | C | 7.4 | C | 5.6 | C | 7.3 | C |
| CE 4B | 20% FH 95 G | 3 | C | 5.4 | C | 10.5 | C | 6.6 | C |
| CE 4D | 40% FH 95 G | 0.7 | C | 2.6 | C | 15.7 | C | 3.8 | C |

180° Peel to HDPE

| Tackifier ladder with Snowtack FH95G | Variant | Unactivated | | | | Activated | | | |
|---|---|---|---|---|---|---|---|---|---|
| | | 1 hr dwell | FM (A = adhesion; C = cohesion) | 24 hr dwell | FM (A = adhesion; C = cohesion) | 1 hr dwell | FM (A = adhesion; C = cohesion) | 24 hr dwell | FM (A = adhesion; C = cohesion) |
| IE 1 | Alone | 1.7 | A | 5.9 | A | 1.8 | A | 1.3 | A |
| IE 1A | 10% FH 95G | 4.7 | A | 8 | A | 4.8 | A | 9 | A |
| IE 1B | 20% FH 95 G | 8.8 | A | 12 | A | 10.5 | A | 10.1 | A |
| IE 1C | 30% FH 95 G | 3.5 | A | 2.9 | A | 15.7 | A | 8.1 | A |
| IE 1D | 40% FH 95 G | 1.5 | A | 0.9 | A | 9.6 | A | 4 | A |
| IE 2 | Alone | 1.3 | A | 1.9 | A | 4.3 | A | 3.7 | A |
| IE 2A | 10% FH 95G | 3.8 | A | 8.3 | A | 4.8 | A | 9.7 | A |
| IE 2B | 20% FH 95 G | 4.4 | A | 3.9 | A | 15.9 | A | 14.1 | A |
| IE 2C | 30% FH 95 G | 1.3 | A | 0.9 | A | 10.6 | A | 4.8 | A |
| IE 2D | 40% FH 95 G | 0.8 | A | 0.6 | A | 8 | A | 5.5 | A |
| IE 3 | Alone | 2.3 | A | 2.5 | A | 1.7 | A | 1.6 | A |
| IE 3A | 10% FH 95G | 5.1 | A | 7.6 | A | 5.7 | A | 8.3 | A |
| IE 3B | 20% FH 95 G | 2.2 | A | 4 | A | 6.8 | A | 8.4 | A |
| IE 3C | 30% FH 95 G | 1.4 | A | 1.4 | A | 8.1 | A | 6 | A |
| IE 3D | 40% FH 95 G | 0.7 | A | 0.9 | A | 8.8 | A | 3.3 | A |
| IE 4 | Alone | 10.2 | A | 2.4 | A | 1.6 | A | 1.4 | A |
| IE 4A | 10% FH 95G | 4.8 | A | 7.5 | A | 5 | A | 7.3 | A |
| IE 4B | 20% FH 95 G | 4.2 | A | 4.2 | A | 9.7 | A | 7.8 | A |
| IE 4C | 30% FH 95 G | 1.9 | A | 0.7 | A | 8.3 | A | 6.2 | A |
| IE 4D | 40% FH 95 G | 0.8 | A | 0.8 | A | 6 | A | 4.9 | A |
| IE 5 | Alone | 7.9 | C | 4.1 | C | 1.6 | A | 1 | A |
| IE 5A | 10% FH 95G | 3.9 | A | 6.2 | A | 4.7 | A | 6.7 | A |
| IE 5B | 20% FH 95 G | 3.6 | A | 2 | A | 12.8 | A | 8.6 | A |
| IE 5C | 30% FH 95 G | 1.1 | A | 0.4 | A | 9.9 | A | 6.6 | A |
| IE 5D | 40% FH 95 G | 1.5 | A | 0.5 | A | 5.6 | A | 5.6 | A |
| IE 6 | Alone | 0.7 | A | 1.3 | A | 0.4 | A | 0.3 | A |
| IE 6A | 10% FH 95G | 3.6 | A | 5.7 | A | 1.9 | A | 3.3 | A |
| IE 6B | 20% FH 95 G | 1 | A | 2.1 | A | 5.6 | A | 6 | A |
| IE 6C | 30% FH 95 G | 0.4 | A | 0.5 | A | 8.7 | A | 5.4 | A |
| IE 6D | 40% FH 95 G | 0.3 | A | 0.6 | A | 6.6 | A | 3.5 | A |
| IE 7 | Alone | 1 | A | 1.2 | A | 1 | A | 0.6 | A |
| IE 7A | 10% FH 95G | 4.2 | A | 6.8 | A | 4.9 | A | 6.7 | A |
| IE 7B | 20% FH 95 G | 2 | A | 3.2 | A | 7.1 | A | 8 | A |
| IE 7C | 30% FH 95 G | 0.7 | A | 1 | A | 9.1 | A | 6.4 | A |
| IE 7D | 40% FH 95 G | 0.5 | A | 0.7 | A | 6.9 | A | 3.3 | A |
| IE 8 | Alone | 1.5 | A | 1.3 | A | 0.4 | A | 0.3 | A |
| IE 8A | 10% FH 95G | 3.3 | A | 5.1 | A | 2.9 | A | 5.8 | A |
| IE 8B | 20% FH 95 G | 1.3 | A | 2.1 | A | 5 | A | 7.4 | A |
| IE 8C | 30% FH 95 G | 0.6 | A | 0.8 | A | 7.9 | A | 5.8 | A |
| IE 8D | 40% FH 95 G | 0.4 | A | 0.7 | A | 7.4 | A | 3.3 | A |
| IE 9 | Alone | 1.2 | A | 1.1 | A | 1 | A | 1 | A |
| IE 9A | 10% FH 95G | 4.6 | A | 6.8 | A | 5.3 | A | 7.5 | A |
| IE 9B | 20% FH 95 G | 1.9 | A | 2.4 | A | 7.3 | A | 7.8 | A |
| IE 9C | 30% FH 95 G | 0.9 | A | 1 | A | 9.6 | A | 6.9 | A |
| IE 9D | 40% FH 95 G | 0.6 | A | 0.9 | A | 7.8 | A | 3.4 | A |
| IE 10 | Alone | 0.6 | A | 0.6 | A | 1.7 | A | 1.6 | A |
| IE 10A | 10% FH 95G | 5.3 | A | 6.8 | A | 7.3 | A | 7.6 | A |
| IE 10B | 20% FH 95 G | 3.3 | A | 4.6 | A | 10.5 | A | 8.7 | A |
| IE 10C | 30% FH 95 G | 1.7 | A | 1.6 | A | 9.5 | A | 7.9 | A |
| IE 10D | 40% FH 95 G | 0.7 | A | 0.8 | A | 3.4 | A | 3.2 | A |
| IE 11 | Alone | 1 | A | 1.4 | A | 1.6 | A | 1.4 | A |
| IE 11A | 10% FH 95G | 5.3 | A | 6.6 | A | 6.9 | A | 8.3 | A |
| IE 11B | 20% FH 95 G | 2.7 | A | 4.1 | A | 9.4 | A | 8.5 | A |
| IE 11C | 30% FH 95 G | 1.4 | A | 1.2 | A | 10.2 | A | 8.6 | A |
| IE 11D | 40% FH 95 G | 0.7 | A | 0.6 | A | 9.3 | A | 4.2 | A |
| IE 12 | Alone | 0.6 | A | 0.8 | A | 1.7 | A | 1.3 | A |
| IE 12A | 10% FH 95G | 4.2 | A | 6.7 | A | 6.4 | A | 8 | A |
| IE 12 B | 20% FH 95 G | 2.7 | A | 4 | A | 9.9 | A | 5.1 | A |
| IE 12C | 30% FH 95 G | 1.3 | A | 1.6 | A | 11.2 | A | 7.9 | A |
| IE 12D | 40% FH 95 G | 1.3 | A | 0.8 | A | 10.1 | A | 5.1 | A |
| IE 13 | Alone | 1.2 | A | 2.8 | A | 2.3 | A | 3.4 | A |
| IE 13A | 10% FH95G | 6.4 | A | 8.6 | A | 3.4 | A | 7 | A |

TABLE 4-continued

Adhesion Test Results

| | | | | | | | | |
|---|---|---|---|---|---|---|---|---|
| IE 13B | 20% FH 95 G | 7.6 | A | 9.9 | A | 12 | A | 11.1 | A |
| IE 13C | 30% FH 95 G | 3.5 | A | 3.6 | A | 12.6 | A | 10 | A |
| IE 13D | 40% FH 95 G | 1.9 | A | 2.1 | A | 10.7 | A | 2.5 | A |
| CE 2 | Alone | 2.8 | A | 2.2 | A | 3.7 | A | 3.1 | A |
| CE 2A | 10% FH 95G | 6.6 | A | 9.1 | A | 3.5 | A | 6.7 | A |
| CE 2B | 20% FH 95 G | 10.2 | A | 11.2 | A | 10 | A | 10.4 | A |
| CE 2C | 30% FH 95 G | 10.6 | A | 1.2 | A | 15.8 | A | 11.9 | A |
| CE 2D | 40% FH 95 G | 9.5 | A | 10.1 | A | 16.9 | C | 5.7 | A |
| CE 3A | 10% DR-0708 | 1.8 | A | 3.1 | A | 2.5 | A | 3.5 | A |
| CE 3B | 20% DR-0708 | 0.8 | A | 0.6 | A | 5.5 | A | 2.5 | A |
| CE 3C | 30% DR-0708 | 3.8 | A | 3.4 | C | 5.5 | A | 2.7 | C |
| CE 3D | 40% DR-0708 | 0.9 | A | 1.1 | C | 1.6 | A | 1.6 | C |
| CE 4 | Alone | 4.3 | C | 8.8 | C | 5.7 | C | 8.8 | C |
| CE 4B | 20% FH 95 G | 4 | C | 5.5 | C | 9.7 | C | 6.7 | C |
| CE 4D | 40% FH 95 G | 0.6 | C | 1.6 | C | 12 | C | 5.7 | C |

Blocking Testing
Test Method

Blocking tests use unactivated (i.e., unheated) test strips and face the adhesive towards a piece of polyester film or direct thermal paper (image layer towards adhesive) fixed to a stainless steel panel. This construction is placed in a 50° C. oven for 1 week with a 1 kg weight on top of the test strip with the resulting pressure of greater than or equal to 12 grams per cm². After one week, the construction is placed in a controlled temperature (72° F.) and humidity (50% RH) room overnight to equilibrate. The test strip is then subjected to the above described 180° peel force test.

TABLE 5

Blocking Test Results

| Tackifier ladder with Snowtack FH95G | Variant | Blocking, 50° C. for 1 week weighted w/2 × 1 kG Peeled from PET | | FM (A = adhesion; C = cohesion) |
|---|---|---|---|---|
| IE 1 | Alone | 5.7 | 4.7 | A |
| IE 1A | 10% FH 95G | 9.2 | 8.5 | A |
| IE 1B | 20% FH 95G | 3.8 | 3.7 | A |
| IE 1C | 30% FH 95G | 3.4 | 3.2 | A |
| IE 1D | 40% FH 95G | 3.1 | 2.4 | A |
| IE 2 | Alone | 4.7 | 3.2 | A |
| IE 2A | 10% FH 95G | 2.7 | 3 | A |
| IE 2B | 20% FH 95G | 2.3 | 2.2 | A |
| IE 2C | 30% FH 95G | 4.3 | 3.2 | C |
| IE 2D | 40% FH 95G | 4.7 | 3.1 | A |
| IE 3 | Alone | 14.9 | 14.2 | C |
| IE 3A | 10% FH 95G | 5.1 | 5.3 | A |
| IE 3B | 20% FH 95G | 3 | 3 | A |
| IE 3C | 30% FH 95G | 3.4 | 3.4 | A |
| IE 3D | 40% FH 95G | 5 | 5.1 | A |
| IE 4 | Alone | 16.5 | 15.9 | C |
| IE 4A | 10% FH 95G | 4.1 | 3.5 | A |
| IE 4B | 20% FH 95G | 12.3 | 5.9 | C |
| IE 4C | 30% FH 95G | 5.2 | 4.9 | A |
| IE 4D | 40% FH 95G | 6.5 | 6.2 | A |
| IE 5 | Alone | 16 | 16.2 | C |
| IE 5A | 10% FH 95G | 3.6 | 2.8 | A |
| IE 5B | 20% FH 95G | 12.4 | 6.5 | C |
| IE 5C | 30% FH 95G | 7.1 | 7.2 | C |
| IE 5D | 40% FH 95G | 10.1 | 12.2 | C |
| IE 6 | Alone | 0.7 | 0.8 | A |
| IE 6A | 10% FH 95G | 3.1 | 2.2 | A |
| IE 6B | 20% FH 95G | 2.2 | 2.1 | A |
| IE 6C | 30% FH 95G | 2.7 | 2.7 | A |
| IE 6D | 40% FH 95G | 2.2 | 2.5 | A |
| IE 7 | Alone | 2.8 | 2.9 | A |
| IE 7A | 10% FH 95G | 4.7 | 4 | A |
| IE 7B | 20% FH 95G | 2.7 | 2.8 | A |
| IE 7C | 30% FH 95G | 2.9 | 2.6 | A |
| IE 7D | 40% FH 95G | 4.2 | 3.6 | A |
| IE 8 | Alone | 1.7 | 1.6 | A |
| IE 8A | 10% FH 95G | 4.5 | 4.1 | A |
| IE 8B | 20% FH 95G | 2.8 | 2.6 | A |
| IE 8C | 30% FH 95G | 3.2 | 3 | A |
| IE 8D | 40% FH 95G | 4.8 | 4.5 | A |
| IE 9 | Alone | 6.2 | 5.3 | C |
| IE 9A | 10% FH 95G | 4 | 2.9 | A |
| IE 9B | 20% FH 95G | 3.3 | 3.1 | A |
| IE 9C | 30% FH 95G | 2.5 | 2.3 | A |
| IE 9D | 40% FH 95G | 3.7 | 3.4 | A |
| IE 10 | Alone | 5.4 | 4.5 | A |
| IE 10A | 10% FH 95G | 2.1 | 1.8 | A |
| IE 10B | 20% FH 95G | 1.8 | 1.3 | A |
| IE 10C | 30% FH 95G | 1.7 | 1.4 | A |
| IE 10D | 40% FH 95G | 2.6 | 1.4 | A |
| IE 11 | Alone | 15.3 | 13 | C |
| IE 11A | 10% FH 95G | 3.9 | 3.7 | A |
| IE 11B | 20% FH 95G | 2 | 1.9 | A |
| IE 11C | 30% FH 95G | 2.2 | 1.9 | A |
| IE 11D | 40% FH 95G | 3.4 | 2.3 | A |
| IE 12 | Alone | 17.6 | 15.6 | C |
| IE 12A | 10% FH 95G | 8 | 12.6 | A |
| IE 12B | 20% FH 95G | 5.1 | 4.7 | A |
| IE 12C | 30% FH 95G | 4.3 | 3.9 | A |
| IE 12D | 40% FH 95G | 6.2 | 4.9 | A |
| IE 13 | Alone | 7.9 | 7.6 | C |
| IE 13A | 10% FH 95G | 8.6 | 8.4 | A |
| IE 13B | 20% FH 95G | 6.6 | 6.3 | A |
| IE 13C | 30% FH 95G | 5.1 | 4.6 | A |
| IE 13D | 40% FH 95G | 4.3 | 3.2 | A |
| CE 2 | Alone | 7.5 | 6.5 | C |
| CE 2A | 10% FH 95G | 7.3 | 6.8 | A |
| CE 2B | 20% FH 95G | 22.1 | 21.3 | C |
| CE 2C | 30% FH 95G | 18.5 | 16.5 | C |
| CE 2D | 40% FH 95G | 12.4 | 11.1 | A |
| CE 3A | 10% DR-0708 | 3.7 | 4.1 | A |
| CE 3B | 20% DR-0708 | 4.1 | 4 | A |
| CE 3C | 30% DR-0708 | 6.1 | 5.6 | A |
| CE 3D | 40% DR-0708 | 7.3 | 6 | A |
| CE 4 | Alone | 1.5 | 2 | C |
| CE 4B | 20% FH 95G | 1.1 | 1.5 | C |
| CE 4D | 40% FH 95G | 3.3 | 4.1 | C |

Applications Summary

In general, a good adhesive system provides low (~<2 N/in) adhesion to high surface energy (e.g., stainless steel) and low surface energy (e.g., HDPE) surfaces prior to activation and high adhesion to those surfaces after activation. For stainless steel, adhesion greater than 8 N/in is generally regarded as good and for HDPE, greater than 5

N/in is good. The larger the change between the unactivated and activated adhesion values, the better the adhesive in end-applications. The preferred failure mode is an adhesive failure where the adhesive removes cleanly from the substrate it is applied to; whereas an unfavorable failure like cohesive failure is the adhesive splitting and remaining on the surface and adhesive coated facestock. Blocking values (N/in) should average under 5 N/in, with lower than 2 N/in being better. Again adhesive failure is preferred for blocking tests as well.

All examples without tackifier had poor adhesion delta and often had generally low adhesion. Illustrative Examples 4 and 5 are less preferred due to mixed failure modes and higher unactivated adhesion values due to higher stage two amounts. Illustrative Examples 10 and 11 exhibited particularly low blocking numbers and unactivated adhesion with high activated adhesion.

Comparative Example 1 reversed the order of stages during polymerization and failed to produce a stable emulsion, which is unfavorable. Comparative Example 2 used a lower BA concentration by substituting EHA for BA, which caused very high blocking numbers and unactivated adhesion. Comparative Example 3 should be directly compared to Illustrative Example 2 because it uses the same base polymer but a different, non-hydrogenated, tackifier. This caused low adhesion to HDPE and high unactivated adhesion to SS. The blocking is not as good as the Illustrative Examples. Comparative Example 4 combined two stages into a single stage feed which caused general cohesive failure and poor overall adhesion.

What is claimed is:

1. An activatable adhesive composition, comprising:
    a two-stage polymer particle, comprising:
        a first stage comprising a hydrophilic acrylic polymer with a first Hansch value having an acid content of less than 200 mg KOH/g;
        a second stage polymerized within the first stage and comprising a hydrophobic acrylic polymer with a second Hansch value larger than the first Hansch value; and
    a tackifier soluble in the first stage and the second stage.

2. The activatable adhesive composition of claim 1, wherein the first stage has a glass transition temperature from 40 to 150° C.

3. The activatable adhesive composition of claim 1, wherein the second stage has a glass transition temperature from −80 to −30° C.

4. The activatable adhesive composition of claim 1, wherein the hydrophilic acrylic polymer has a molecular weight from 5,000 to 10,000 g/mol.

5. The activatable adhesive composition of claim 1, wherein the hydrophobic acrylic polymer has a molecular weight from 30,000 to 100,000 g/mol.

6. The activatable adhesive composition of claim 1, wherein the first stage comprises from 10 to 50 weight percent of the total weight of the first stage and the second stage.

7. The activatable adhesive composition of claim 1, wherein the tackifier is a hydrogenated rosin ester tackifier with a softening point between 90 and 110° C.

8. The activatable adhesive composition of claim 1, wherein the tackifier comprises from 5 to 50 weight percent of the adhesive composition, based on the dry weight of the adhesive composition.

9. The activatable adhesive composition of claim 1, wherein the hydrophobic acrylic polymer is synthesized from butyl acrylate monomers and comprises at least 80 weight percent of the second stage, based on the total weight of the second stage.

10. The activatable adhesive composition of claim 1, wherein the hydrophilic acrylic polymer comprises monomer selected from the group consisting of acrylic acid, methacrylic acid, esters of acrylic acid and methacrylic acid, itaconic acid, crotonic acid, acrylamide, methacrylamide, derivatives of acrylamide and methacrylamide, and mixtures of two or more thereof.

11. The activatable adhesive composition of claim 10, wherein the esters of acrylic acid and methacrylic acid are selected from the group consisting of alkyl esters, hydroxyalkyl esters, phosphoalkyl esters, sulfoalkyl esters, and mixtures of two or more thereof.

12. The activatable adhesive composition of claim 1, the first stage further comprising styrene.

13. The activatable adhesive composition of claim 1, wherein the esters of acrylic acid and methacrylic acid are selected from the group consisting of alkyl esters, hydroxyalkyl esters, phosphoalkyl esters, sulfoalkyl esters, and mixtures of two or more thereof.

14. The activatable adhesive composition of claim 1, the second stage further comprising styrene.

15. A pressure sensitive adhesive composition comprising the activatable adhesive composition of claim 1.

16. A linerless label comprising the pressure sensitive adhesive composition of claim 14.

17. A linerless tape comprising the pressure sensitive adhesive composition of claim 14.

18. A heat seal coating comprising the pressure sensitive adhesive composition of claim 14.

19. A method for adhering a first substrate to a second substrate, comprising:
    applying the activatable adhesive composition of claim 1 to a surface of the first substrate;
    heating the activatable adhesive composition; and
    bringing the surface of the first substrate into contact with a surface of the second substrate.

* * * * *